United States Patent [19]

Ruthner

[11] 4,035,949
[45] July 19, 1977

[54] INSTALLATION FOR REARING PLANTS

[76] Inventor: Othmar Ruthner, 150 Sieveringerstrasse, A-1190 Vienna, Austria

[21] Appl. No.: 574,847

[22] Filed: May 6, 1975

[30] Foreign Application Priority Data

May 6, 1974 Austria .................. 3727/74

[51] Int. Cl.² .............................. A01G 9/00
[52] U.S. Cl. ............................. 47/17; 47/60
[58] Field of Search .......... 47/1.2, 17, 19, 29; 198/129

[56] References Cited

U.S. PATENT DOCUMENTS

| 831,448 | 9/1906 | Leinweber | 198/129 |
| 3,254,447 | 6/1966 | Ruthner | 47/1.2 |
| 3,254,448 | 6/1966 | Ruthner | 47/1.2 |
| 3,869,826 | 3/1975 | Fischer | 47/17 |

FOREIGN PATENT DOCUMENTS 944,153  3/1974  Canada .................. 47/1.2

Primary Examiner—Edgar S. Burr
Assistant Examiner—James R. Feyrer
Attorney, Agent, or Firm—Imirie, Smiley & Linn

[57] ABSTRACT

An installation for rearing plants, comprising a plurality of successive culture chambers, each of said culture chambers comprising an endless circulating system on which plants are moved through zones under controlled environmental conditions, each of said culture chambers being confined at each end by an end wall panel which has the same configuration as the vertical transverse section of the culture chamber, said end wall panels being connected by elements which connect the peripheral edges of the disks and laterally confine the culture chamber.

4 Claims, 7 Drawing Figures

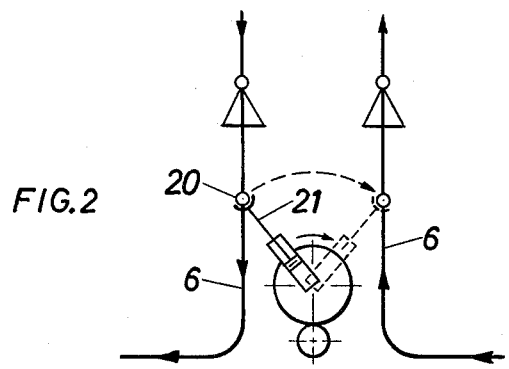
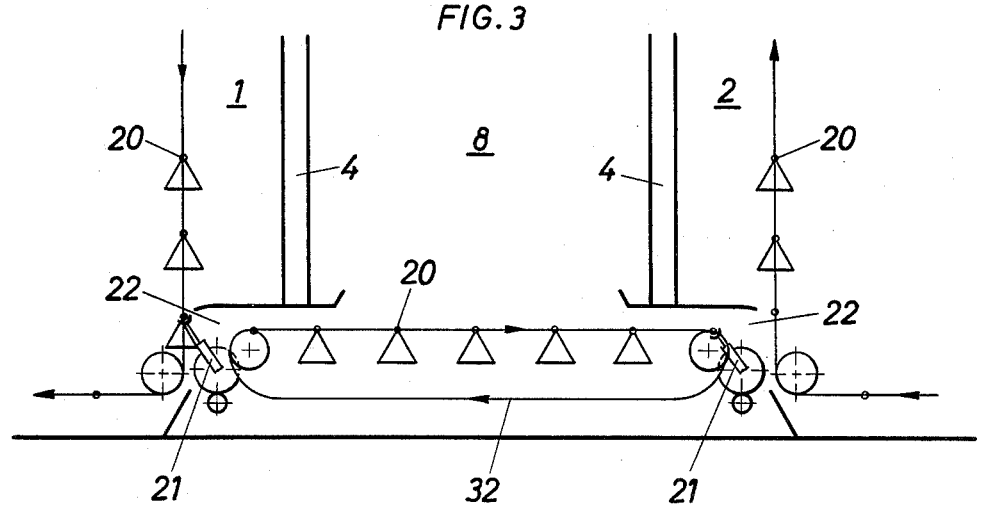

INSTALLATION FOR REARING PLANTS

SUMMARY OF THE INVENTION

An installation for rearing plants, comprising a plurality of successive culture chambers, each of which is confined at its ends by an end wall panel which has the same configuration as the cross-section of the culture chamber, said end wall panels being connected by roof elements and side wall elements.

The invention relates to an installation for rearing plants, the structure of which offers the advantage of enabling erecting of any number of culture chambers and manipulation chambers by using the same elements in a standard unit system so as to match the living space of the plant being reared therein to the development of the same or the desired rearing program.

In the continuous production of plants or their constituent substances and the further processing thereof, during their growth through a controlled selection of environmental factors, independently of their geographical location, in such a way that it is possible to reach a chosen production target optimally for each of the plants used. In known methods the plants are conveyed by means of moving-belt systems or circulating tracks through conditioning chambers in horizontal, oblique or vertical directions, during which at regular intervals of time seed is introduced into the production installation and plant-products ready for cropping are constantly removed.

It is an object of the invention to make it possible to bring the plants in all their stages of growth into optimal contact with the controllable environmental factors, using the minimum space required under various conditions and also to create special reaction chambers for the purpose of improved manipulation or special handling in addition to the culture chambers.

A young plant requires a substantially smaller culture chamber than the mature plant. Depending on morphological form and degree of growth when ready for cropping, the individual culture volumes often amount to a multiple of their initial size. Thus for example a young paprika plant requires a culture chamber of about 2 liters whereas the plant at cropping time needs 50–80 liters dependent on the variety. Ratios of up to 1:100 often exist.

For this reason it is an object of the invention to provide an installation which comprises a plurality of successive culture chambers and which takes the above-mentioned problems into consideration and in which, according to a feature of the invention, plants are moved on circulating systems through zones under controlled environmental conditions.

According to a further feature of the invention, identical frames defining the outline of the vertical cross-sections of the culture chambers are provided at distances from one another, connected by side walls or supporting members of the same, and carry sealing walls, partition walls or the like.

According to a further feature of the invention it is expedient for such culture chambers to employ circulating systems in which circulating belts are led freely suspended over driving and supporting rollers.

According to a further feature of the invention, two plate-like partition walls, disposed at a distance from one another and between which a manipulation chamber is provided to receive apparatus for modification of the environment and apparatus for moving plants from one culture chamber to the following one and so on, can be arranged at least at separate points between neighboring culture chambers and/or at at least one end of the installation.

Further features of the invention are explained in detail with reference to the drawings in which examples of the installation in accordance with the invention and its equipment are illustrated diagrammatically.

FIGS. 2 and 3 are partial, diagrammatic side elevational views of two embodiments of manipulation chambers for use between adjacent culture chambers of the device of FIG. 1 according to the present invention;

Figure 1:
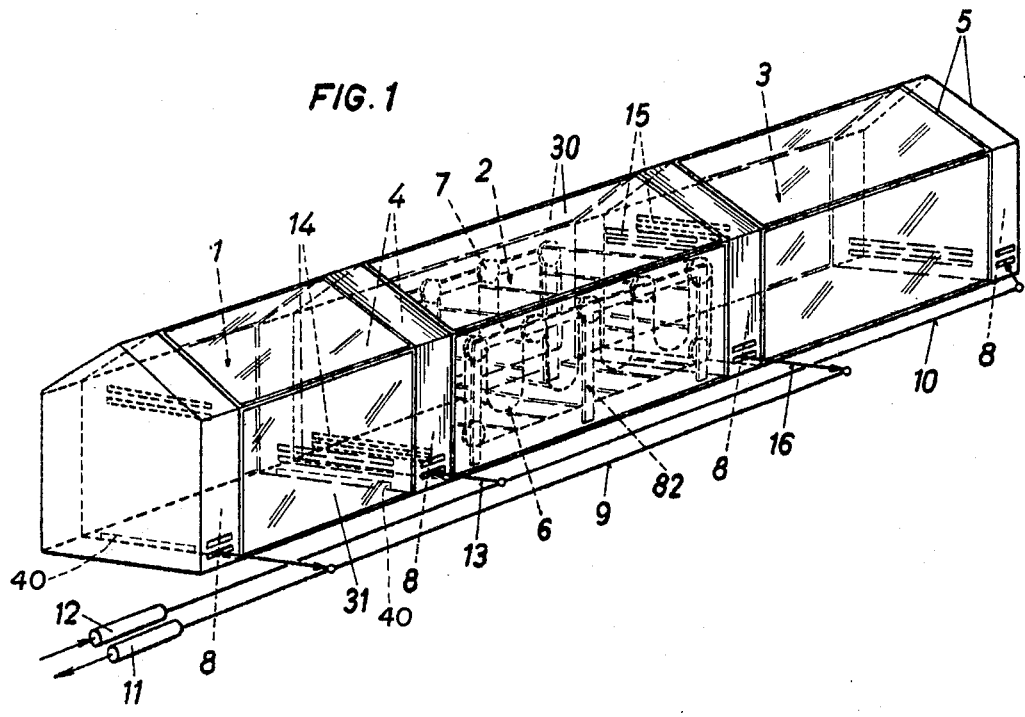
FIG. 1 is a diagrammatic perspective view of one embodiment of an installation with three culture chambers according to the present invention.
Figure 4:
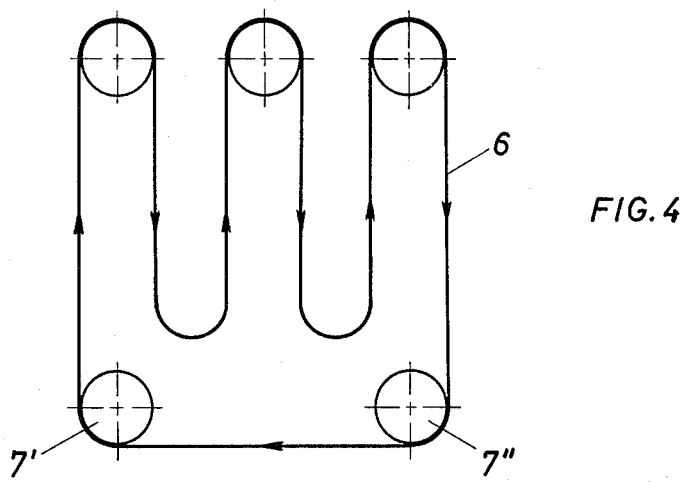
FIG. 4 is a diagrammatic side elevational view showing the circulating system of the device of FIG. 1.

The installation shown in FIG. 1 is divided into three culture chambers 1, 2, 3 which are closed at the front ends by partition end wall panels 4 enclosed by a respective frames 5 defining the outline shape of the cross-section of the culture chambers. The roof elements 30 and side wall elements 31 may be any desired elements which connect the end wall panels 4. The individual lengths of these culture chambers depend on the mean values for the individual stages of growth and reaction time of plants to chemo-physiological influences; i.e., the influence of chemicals such as hydrates on the plants. In each of these culture chambers there is an endless meandering revolving belt, which comprises two revolving chains 6. Spaced apart supports 20 extend between and are secured to the chains 6. The plants are intermittently or continuously moved by these belts, which for the sake of clearness are shown separately from the culture chambers in FIGS. 4 and 5.

Preferably the circulating belts are only driven or carried by upper driving and supporting rollers 7, which are floatingly mounted in suitable brackets carried by the side walls 31, or roof elements 30. These brackets may be slidable along the side walls or roof elements so that the distance between adjacent rollers can be changed. Loops result, which depend freely. The number of said loops may be selected as is desired or may be determined by the available length of the culture chamber. Reversing pulleys 7', 7" for reversing the belt are provided only at the lower reversing bends of the meandering zone. The constant lengths of the loops are determined by the gear drive.

In particular cases, particularly when transferring plant supporting plates from one conditioned chamber to the other — provided that the culture chamber 1 or 2 or 3 is divided into a plurality of conditioned chambers — the circulating belt can also be guided positively at the bottom by means of chain sprockets.

The culture chambers ensure that the growth of the plants follows a controlled ecophysiological course, the word ecophysiological referring to the influence of surrounding conditions such as sun, wind, humidity, etc. on the plants. However they can also serve as reaction chambers in which physico-chemical reactions (chemophysiological reactions) caused for example by exposure of the plants to $CO_2$, $CN$, $C_2H_4$, $NH_3$ etc. or by irradiation of the plants by exposure to a radioactive material (to affect the formation of secondary metabolic products) are carried out. The reaction chambers are for the most part closed or isolated with suitable air locks.

Figure 7:
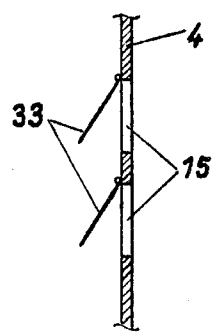
FIG. 7 is a partial sectional view of flap-controlled slots in an end wall panel of the device of FIG. 1.

The end culture chambers 1 and 3 are confined at thier outer ends by double end wall panels 4, which define between them a space 8. Such space 8 is also provided between adjacent culture chambers of the installation and constitutes a manipulation chamber, which may be covered by the elements 30 and 31 and in which apparatus for supplying the oil mixture in the culture chambers, apparatus for moving the plants from one rearing chamber to another, and so on may be provided. In the illustrated example, two pipes 9, 10 are provided, pipe 10 supplying prepared air from a supply source to branch pipes 13 which discharge the air through alternate spaces 8 and through flap-controlled slots 14 in the end wall panels 4 into the culture chambers while the other pipe 9 carries used air out of the culture chambers to a treatment unit 11. As can be seen from FIG. 1, the supply system can be constructed so that the successive manipulation chambers are alternately designed to supply and extract the air. In the case of the manipulation chambers designed to supply the air, the slots 14 note above are provided at the bottom in both the adjacent end wall panels 4 enclosing this manipulation chamber while the opposite end wall panels 4 defining the air-exhausting manipulation chambers 8 have flap-controlled slots 15 in their upper portions to extract used air to the branch pipes 16 feeding into the pipe 9. As shown in FIG. 7, flaps 33 cooperate with slots 15 to provide the above-noted flap-control, slots 14 being controlled in similar fashion. For the sake of clearness, only one type of slot 14 or 15 has been shown in each end wall panel. It will be understood that any number of slots may be provided. The air enters the space 8 through the overlying portion of element 31 and leaves the space 8 through said slots 14 to enter the culture chambers. Air is exhausted similarly. In a similar way other supply pipes for various gases, nutritious solutions and so on can be provided and hid in the ground underneath the installation or adjacent to it.

Figure 5:
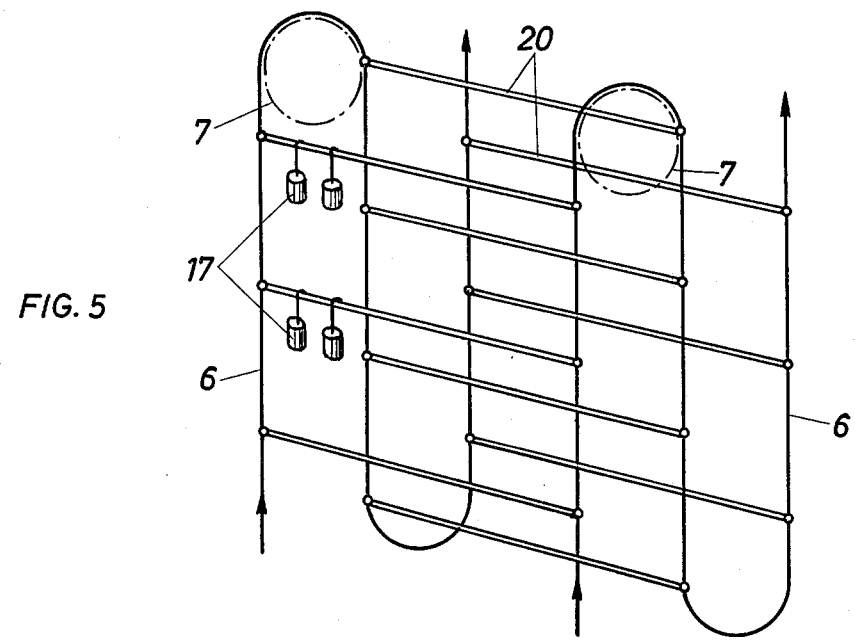
FIG. 5 is a partial, diagrammatic perspective view of the circulating system of FIG. 4.
Figure 6:
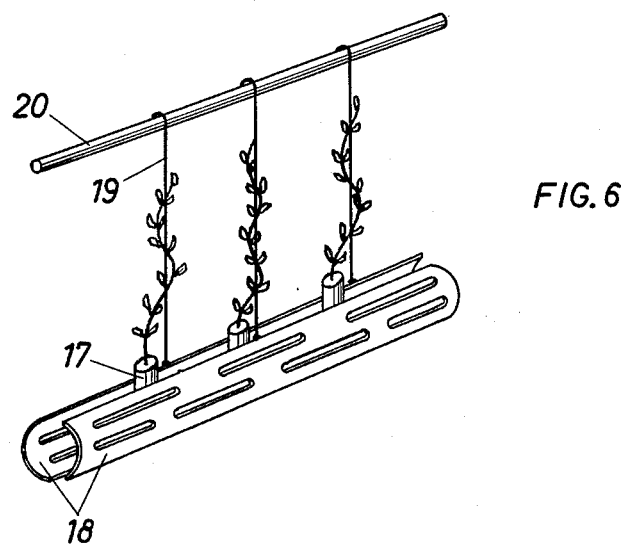
FIG. 6 is a partial, diagrammatic perspective view of an attachment of the circulating system of FIG. 5.

As shown in FIGS. 5 and 6, the seedling or young plant is cultivated in substrate cubes or plugs 17 which are inserted in slotted pipes, tubes or the like 18 at a distance from one another pipes 18 are filled with any suitable material such as pressed material, of plastic or the like to provide nutrients and are suspended by means of wires 19 from carriers 20 which are carried along by the circulating system. The plugs or cubes 17 are arranged in the pipe 18 and the latter suspended from the carrier 20 so that the space between neighboring plants and the vertical distance from the carrier 20 can be increased according to the development of the plants.

The individual culture chambers can be formed such that in each case one rearing section successively progresses so that the plants have to be transferred at the end of each rearing section from the circulating belt of one culture chamber to the circulating belt of the other. This can be effected manually or mechanically, for which purpose the manipulation chambers may be used in which there may be space for an operator or a transfer device which, by means of gripping means 21 lifts the carrier 20 from one circulating belt and places it on the other. The space for the operator is separated from the air supply system. As shown in FIG. 2, these gripping means can be formed as spaced apart swinging arms, which can be moved out and retracted pneumatically or hydraulically.

As is easily apparent from FIG. 2, the carriers 20 are removed from the revolving chains 6 as they descend. The carriers 20 may be retained on the chains 6, e.g., by being inserted into open-topped hooks. When the grippers 21 are in the position shown in solid lines, the carrier 20 moves into engagement with these grippers and is thus lifted out of the retaining hooks, which descend further. The grippers are then swung into the position shown in dotted lines, in which the rising circulating system receives the carriers 20 in an operation which is similar to the delivery of the carriers. The open-topped hooks can lift the carriers 20 from the grippers 21 and the latter then return to the position shown in solid lines. To enable a removal of the carrier from the circulating system of one culture chamber and a transfer of the carriers to the circulating system of the succeeding culture chamber, the end wall panels 4 are formed with suitable apertures 40 through which the grippers move into the culture chamber so that they can receive or deliver the carriers in said culture chamber.

As is apparent from FIG. 3, an additional circulating belt 32 may be provided to move the carriers through the manipulating chamber 4 if grippers 21 as shown in FIG. 2 are provided at the ends of said additional belt 32 and serve to transfer the carriers 20 from the circulating belt of one culture chamber, such as 1, onto the circulating belt 32 and from the latter onto the circulating belt of the succeeding culture chamber 2. During the movement on the circulating belt 32, additional operations, such as cutting out plants, can be carried out on the plants. In the embodiment of FIG. 3 the transfer device is led at both its points of entry into the neighboring culture chambers through locks 22, through which air matched to the actual climatic conditions of the associated culture chamber is blown, preventing a climatic exchange between the two culture chambers.

The roof walls 30 and side walls 31 and the end wall panels 4 confining the culture chambers 1, 2, 3 can be made of transparent or translucent material, with regard to which darkening equipment can be provided for periodic control of light levels. It is also possible, for reflecting natural or synthetic beams of light, to dispose films of reflective material such as aluminium films in conjunction with reeling devices in the manipulation chambers or on the side walls, whereby the absorbed heat can be dissipated by air from the aluminium films while the light is largely reflected. It is also possible to make the end wall panels 4 from aluminium films or cover them with such films. The lighting conditions can also be controlled by changing the distance between the rising and descending parts of the circulating belts, for which the brackets carrying the driving and supporting rollers 7 may be mounted on a horizontal supporting structure 82 so as to be laterally adjustable relative to each other, as mentioned above. By means of a Cardan shaft or a horizontal circulating chain the circulating belts are driven together through chain sprockets.

Obviously various design modifications and extensions can be made within the framework of the invention as defined in the claims.

Thus it is possible for example to make the partition end walls 4, preferably constituted as plates, adjustable so that the lengths of culture chambers can be varied when the rearing program is changed according to the living space required by the development of the plants or the desired duration therein.

With simple plate-like partition walls, apertures can be provided therein for the insertion or passage of transfer devices.

When the buildings of the production installation are very long (several hundred meters) it is advantageous to erect for each conditioned chamber peripherally disposed conditioning stations which are controlled electromechanically from a central building.

Moreover the installation makes it possible for the circulating tracks to be run in the open as well, which especially in the case of young plants later to be transplanted in open country (young plants for forest replenishment), facilitates hardening thereof.

By erecting cooled climatic chambers, possibly from low-level cool and dark chambers for instance, vernalisation "winter seasons" can be simulated. This is necessary for example for plants having growth periods spanning many years and which need cold periods in their development. (For example, strawberry production, forest plants etc.). Winter can also be simulated for conifers in this way.

What is claimed is:

1. An installation for rearing plants, comprising a plurality of successive, independent culture chambers, each of said culture chambers including endless circulating support means on which plants are moved through zones in said chambers under controlled environmental conditions, each of said culture chambers being confined at each end by an end wall panel which has the same configuration as the vertical transverse section of the culture chamber, said end wall panels of each culture chamber being connected by side and roof panels which connect the peripheral edges of the end wall panels and laterally confine the culture chamber, said culture chambers further including reversing pulleys, said endless circulating support means comprising a serpentine, meandering belt having downwardly extending loops which are freely suspended from said reversing pulleys without being constrained about pulleys at their lower ends, said belt comprising two laterally spaced revolving chains interconnected by a series of spaced carriers extending transversely between said chains, said carriers serving to support the plants to be reared, and at least one manipulation chamber defining an enclosed area interposed between adjacent end wall panels of adjacent culture chambers for accommodating means to control the conditions in the culture chambers and the treatment of the plants.

2. An installation as set forth in claim 1, wherein each end wall panel is surrounded by a frame.

3. An installation as set forth in claim 1, wherein said end wall panels have flap-controlled slots for the passage of gas streams, the slots for admitting a gas stream into the culture chamber being disposed in the lower portion of the end wall panel disposed at one end of the culture chamber, and the slots for discharging a gas stream from the culture chamber being disposed in the upper portion of the end wall panel disposed at the other end of the culture chamber.

4. An installation as set forth in claim 1, wherein said end wall panels are provided at their lower end with locks through which the plants to be reared are moved into and out of said culture chambers; and wherein said manipulation chamber includes a conveyor extending between locks of adjacent culture chambers whereby said plants are transported from one culture chamber into said manipulation chamber and from the latter into the succeeding culture chamber.

* * * * *